United States Patent [19]

Takahashi et al.

[11] Patent Number: 5,103,092

[45] Date of Patent: Apr. 7, 1992

[54] METHOD AND APPARATUS FOR DETECTING X-RAY RADIATION

[75] Inventors: Tetsuhiko Takahashi, Tokyo; Manabu Nakagawa, Kanagawa; Toshihiko Shimizu, Hachioji, all of Japan

[73] Assignee: Hitachi Medical Corporation, Tokyo, Japan

[21] Appl. No.: 577,032

[22] Filed: Sep. 4, 1990

[30] Foreign Application Priority Data

Sep. 8, 1989 [JP] Japan .................... 1-233260

[51] Int. Cl.$^5$ .................... G01T 1/00; G01D 18/00
[52] U.S. Cl. .................... 250/252.1; 256/363.09; 256/370.01
[58] Field of Search ........ 250/363.09, 370.15, 250/336.1, 870.01, 252.1; 378/4, 19, 901

[56] References Cited

U.S. PATENT DOCUMENTS

| | | | |
|---|---|---|---|
| 4,323,977 | 4/1982 | Aseneau | 250/363.09 X |
| 4,424,446 | 1/1984 | Inbar et al. | 250/363.09 X |
| 4,517,460 | 5/1985 | Meulenbeugge et al. | 250/252.1 |
| 4,670,840 | 6/1987 | Freundlich | 378/4 X |
| 4,868,393 | 9/1989 | Kiri et al. | 250/370.15 |
| 4,882,495 | 11/1989 | Tanaka | 250/363.09 |
| 4,891,829 | 1/1990 | Deckman et al. | 378/4 |
| 4,899,054 | 2/1990 | Barfod | 250/363.09 X |

FOREIGN PATENT DOCUMENTS

| | | |
|---|---|---|
| 53-68091 | 6/1978 | Japan . |
| 57-14772 | 1/1982 | Japan ................ 250/363.09 |
| 62-3684 | 1/1987 | Japan . |

Primary Examiner—Constantine Hannaher
Assistant Examiner—Edward J. Glick
Attorney, Agent, or Firm—Antonelli, Terry, Stout & Kraus

[57] ABSTRACT

A method of and apparatus for radiation detection including temperature control so that the temperature of the radiation detector, which includes a photodiode with a leakage current of 0.4–18 pA, is controlled to a setup temperature plus or minus 0.35° C. With this condition established, offset data and reference data of the detector are collected in the absence of a body under test, offset data immediately before an actual signal measurement is collected and thereafter signal data through the exposure of a body under test is collected. The collected data are subjected to sensitivity calibration and offset calibration, thereby to obtain projection data, and image data is obtained through image processing of the projection data.

12 Claims, 8 Drawing Sheets

PULSE X-RAY EXPOSURE

CONTINUOUS X-RAY EXPOSURE

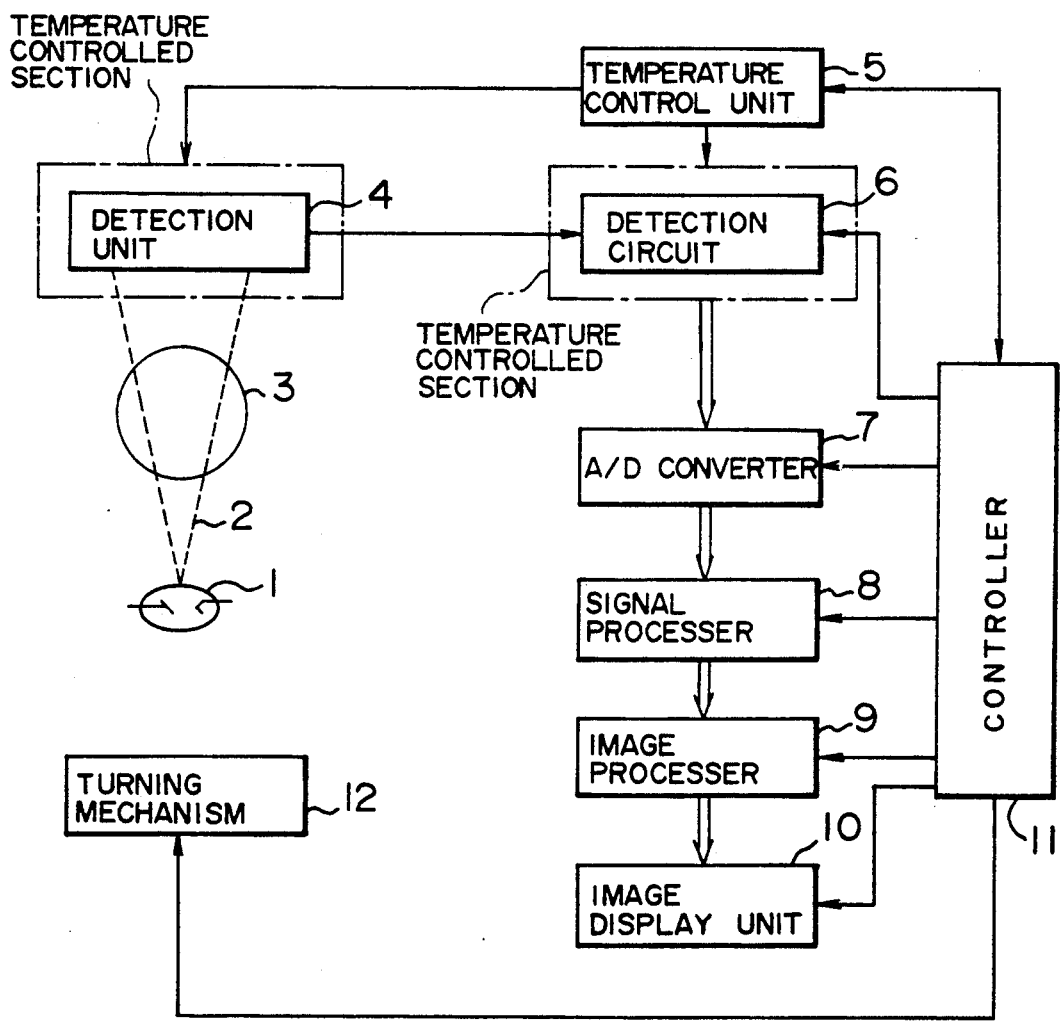
F I G. 2

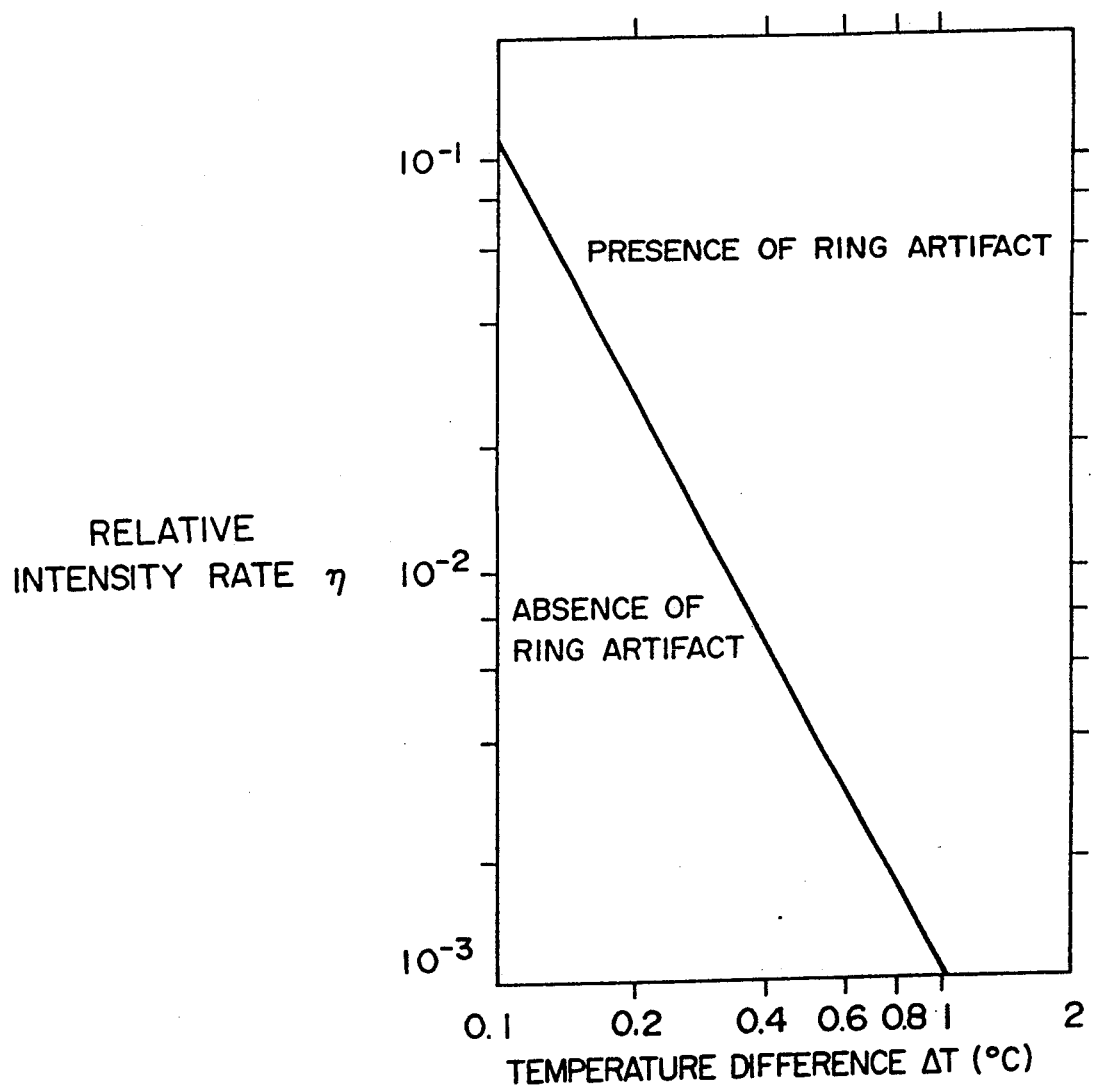
F I G. 5

METHOD AND APPARATUS FOR DETECTING X-RAY RADIATION

BACKGROUND OF THE INVENTION

This invention relates to a radiation detecting apparatus and an apparatus of radiation tomography which uses the same. The following description is with reference to an example of a medical X-ray CT (computerized tomography) for simplicity of explanation.

Recently, there has been proposed, as an X-ray detector for an X-ray CT apparatus, a solid state detector formed of a scintillator and a photodiode. This detector is drawing attention because of its inherently satisfactory signal-to-noise ratio in dealing with the image. In another X-ray CT apparatus based on third generation technology, the variability of sensitivity of X-ray detectors among channels results in differences of the concentration of a image, causing the emergence of ring artifact which is a noise attributable to the concentration difference appearing as concentric circles due to the rotation of the detector. A method of signal modification for alleviating this impropriety is proposed in Japanese Patent Unexamined Publication No. 53-68091, for example.

However, as clinical apparatus are gaining in performance and function these days, X-ray CT apparatus is required to have its imaging operation sped up. Consequently, the X-ray exposure scheme is altered from pulse X-ray exposure to continuous X-ray exposure, and conventional signal calibration alone cannot reduce the ring artifact enough to meet the sophisticated clinical maneuvers. This problem will be explained with reference to FIGS. 1A and 1B.

FIG. 1A is a diagram showing, in the sense of a model, a pulse X-ray exposure scheme. Initially, the sensitivity of the detector is measured in the absence of a body under test. This measurement is for the acquisition, for each sensor, of offset data $O_1$ in the absence of X-ray exposure and reference data R in the presence of X-ray exposure but in the absence of a body under test. In the case of an array of detectors of m in number, m pieces of offset data $O_1$ and m pieces of reference data R are collected. The difference of each set of data ($R-O_1$) is evaluated as reference calibration (or air calibration) data. Also in the measurement of the magnitude of X-rays transmitted through a body under test, offset data without X-ray exposure ($O_{21}$, $O_{22}$, $O_{23}$, ...) and data with X-ray exposure ($S_1$, $S_2$, ...) of the detectors are collected to evaluate difference values ($S_i-O_{2i}$) as signal components. Projection data, which is a set of signals after offset calibration and sensitivity calibration, is obtained as $$\frac{S_i - O_{2i}}{R - O_1}$$

by calculating log $$\frac{S_i - O_{2i}}{R - O_i}$$

from the air calibration data and signal components after logarithm conversion i.e., $\log(S_i-O_{2i})$ and $\log(R-O_1)$.

However, as mentioned previously, as X-ray CT apparatus have gained in imaging speed recently, pulse X-ray exposure is being replaced with continuous X-ray exposure as shown in FIG. 1B. In consequence, the acquisition of offset data for each channel is no more longer carried out, and projection data is now obtained as $$\frac{S_i - O_2}{R - O_1}$$

by using a representative offset data $O_2$ which is collected immediately before tomography.

A problem emerging here is that the variation in the sensitivity of X-ray detectors due to temperature changes during the continuous X-ray exposure imposes an adverse influence on the accuracy of signal detection. This is primarily attributable to a large variation in the sensitivity of the X-ray detector caused by a temperature change. A technique pertinent to the present invention for maintaining the detector temperature constant is disclosed in JP-A-62-3684. This technique is intended to heat the detector to a certain temperature before tomography is conducted, and heating is suspended during the actual tomographic operation so as to avoid inductive noises generated by the heater. When this technique is applied to a pulse X-ray exposure scheme, in which the offset is measured at each X-ray exposure for use as the offset calibration data, no ring artifact occurs even if the detector temperature changes during tomography. However, when this technique is applied to a continuous X-ray exposure scheme, in which the offset is measured only once before tomography, the offset data has a degraded accuracy if the detector temperature changes during X-ray exposure, creating a ring artifact.

SUMMARY OF THE INVENTION

This invention is intended to cope with the foregoing situation, and its prime object is to overcome the foregoing prior art deficiency and provide a method and apparatus for radiation detection which alleviate the variability of the sensitivity of a solid state detector among channels, thereby to speed up the imaging operation.

The above objective of this invention is achieved by the method and apparatus of temperature control for maintaining a constant temperature for the radiation detecting unit which includes a photodiode having a leakage current of a certain range, a scintillator and a photodiode, and a signal processing circuit.

The inventive radiation detecting apparatus includes a temperature controller for maintaining the detector temperature constant, allowing the reduction of nonlinear components in the detector output which cannot be corrected completely through detector sensitivity calibration or detector offset calibration based on the usual software techniques. Particularly, when the method and apparatus are used for X-ray CT apparatus having an image processor which processes the output of the radiation detecting apparatus to perform rearrangement of the image, it is possible to reduce the ring artifact which is attributable to the reduction of imaging time.

BRIEF DESCRIPTION OF THE DRAWINGS

FIG. 2 is a block diagram of an X-ray CT apparatus based on an embodiment of this invention;

FIGS. 5 to 7 are diagrams showing the characteristics of the detector based on an embodiment of the invention.

DESCRIPTION OF THE PREFERRED EMBODIMENTS

Figure 1A:
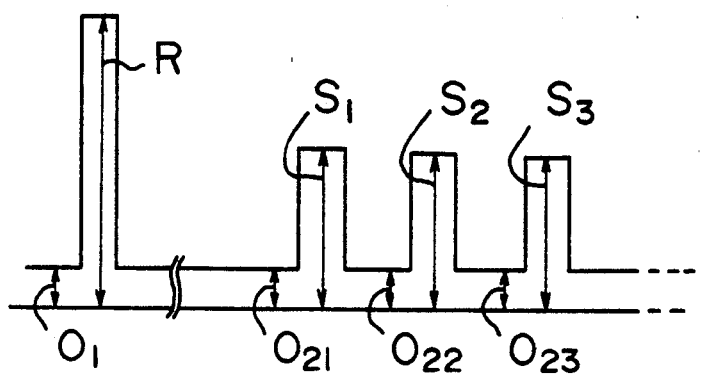
FIG. 1A and FIG. 1B are diagrams explaining X-ray exposure schemes.

Embodiments of this invention will be described in detail with reference to the drawings.

FIG. 2 is a block diagram of an X-ray CT apparatus based on an embodiment of this invention. The apparatus is summarized as follows.

An X-ray beam 2 emitted from an X-ray tube 1 goes through a body under test 3 and is detected by a detection unit 4, in which the intensity of the detected X-ray is converted into an electric current. The detection unit 4 is maintained at a temperature by a temperature controller 5.

The current signal produced by the detection unit 4 is converted into a voltage signal in a detection circuit 6. The voltage signal is converted by an A/D converter 7 from an analog signal to a digital signal which is sent to a signal processor 8. The signal processor 8 implements the calibration for the signal, e.g., sensitivity calibration and offset calibration for each channel of the detection unit 4 and detection circuit 6. From a set of calibrated data, one-dimensional projection data is obtained.

In a third-generation X-ray CT apparatus, numerous projection data are collected by turning the X-ray tube and detection unit by a turning mechanism 12, and a tomographic image of the data is computed by an image processor 9. The computed tomographic image is displayed on an image display unit 10. All functional blocks of the X-ray CT apparatus are controlled by a controller 11. Placed on a turn table driven by the turning mechanism 12 are the X-ray tube 1, detection unit 4, temperature controller 5, detection circuit 6 and A/D converter 7.

Next, the signal input section of the detection unit 4 and detection circuit 6 used in this embodiment will be explained with reference to FIG. 3. The X-ray is converted into the light (visible light) by a scintillator 41. The scintillator used here is, for example, $Gd_2O_2S$: Pr, Ce, F. The symbol ":" denotes that the following components are included in small amounts. The light which has a wavelength of about 500 to 700 nm is converted into a current signal by means of an optoelectric converting element 42, e.g., a crystalline or noncrystalline silicon photodiode, which is in tight contact optically with the scintillator. The scintillator 41 and photodiode 42 are maintained at a constant temperature by the temperature controller in order to minimize the variation in the optical conversion efficiency, optoelectric conversion efficiency and leak current.

Figure 3:
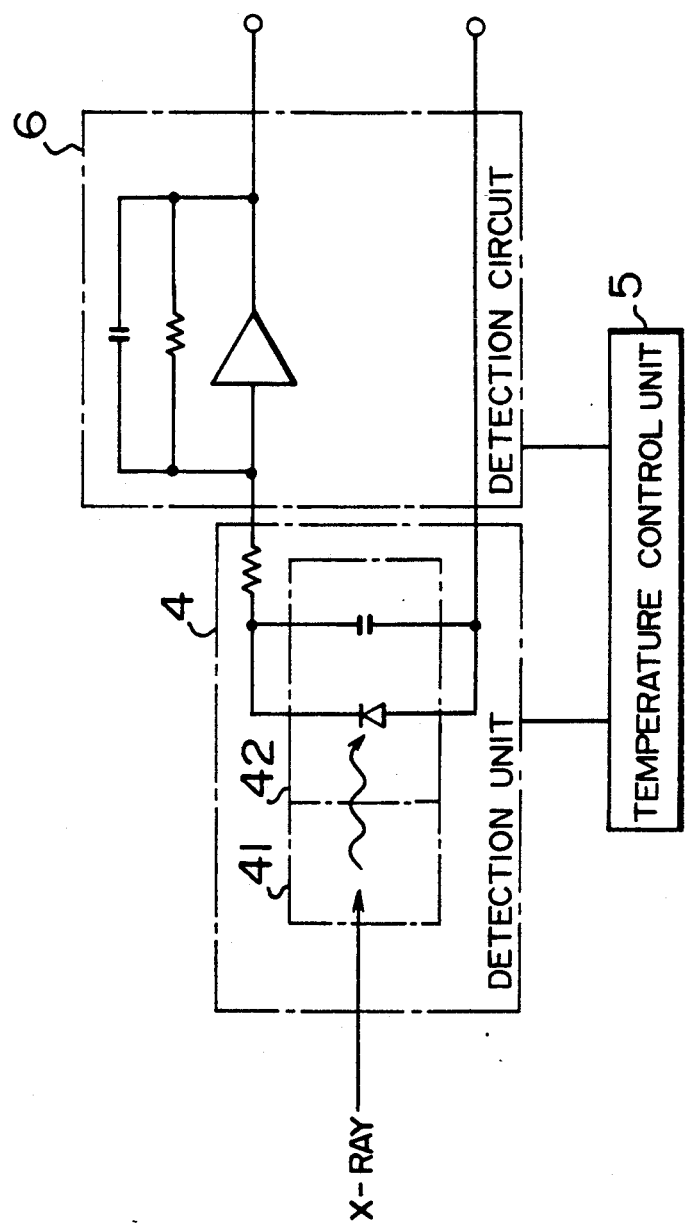
FIG. 3 is a schematic diagram showing an embodiment of the detection circuit.

The photodiode 42 has electrical characteristics as shown in FIG. 3 as an equivalent circuit including a diode, a resistor and a capacitor in the detection unit 4. The output of the diode is delivered to detection circuit 6, e.g., a current-voltage conversion circuit using an operational amplifier so that the diode output is converted into a voltage. This circuit is also under control of the temperature controller in order to prevent variation in the input bias voltage and input bias current to the operational amplifier and in the resistance of the feedback resistor caused by temperature change. The degree of influence of a temperature change of this current-voltage conversion circuit is ½ to 1/10 with respect to that caused by the temperature change of the solid state detector.

Figure 4:
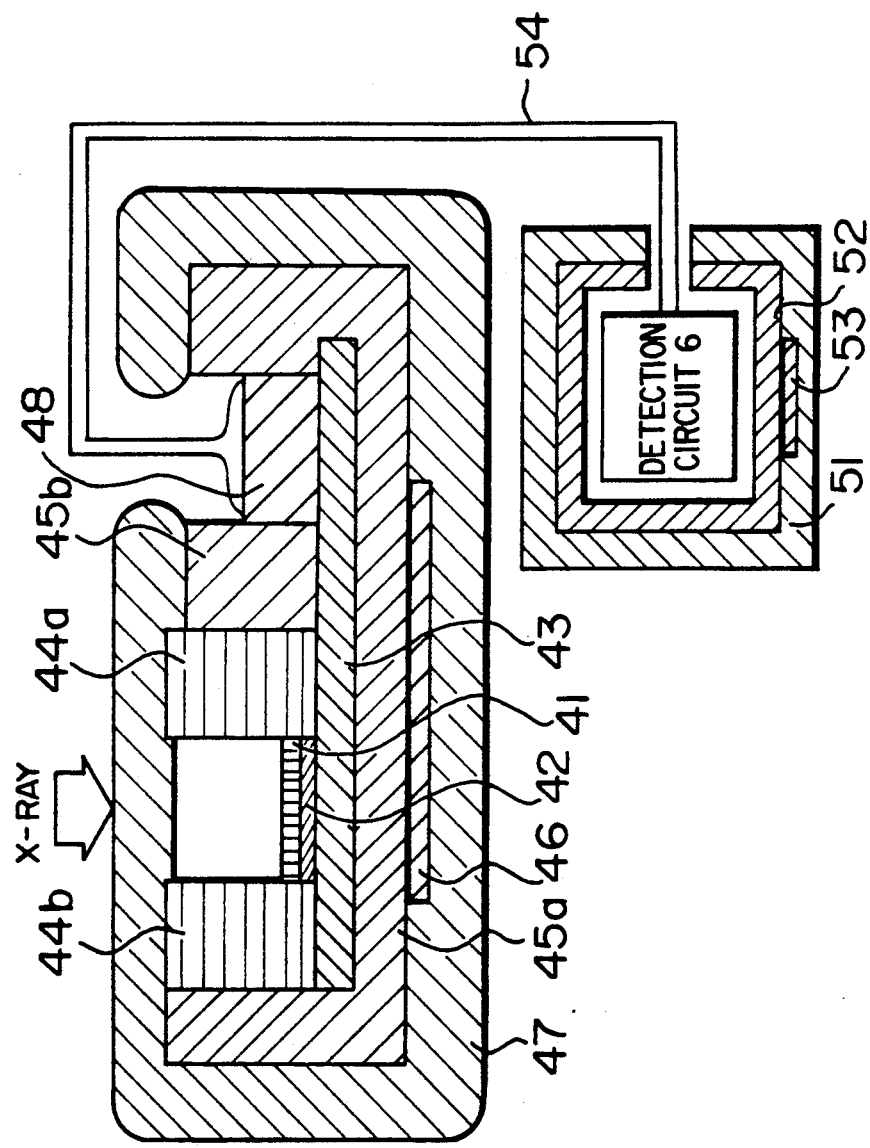
FIG. 4 is a diagram showing the arrangement of the detection unit.

FIG. 4 shows in detail the structure of the detection unit 4 in a cross-sectional view taken on a plane which is orthogonal to the arc of disposition of detectors in the X-ray CT apparatus. In the figure, indicated by 41 is a scintillator, 42 is a photodiode, 43 is a substrate, 44a and 44b are X-ray collimators for selecting the X-ray beam with a certain width, 45a and 45b are housings, 46 is a heater for thermal retention, 47 is a thermal insulation material for thermal retention, and 48 is an output signal connector.

In the detection unit 4 of this embodiment, the incident X-ray is transformed into an electrical signal by means of the photodiode 42 and scintillator 41 fixed on the substrate 43. This signal is introduced to the detection circuit 6 by way of the output signal connector 48 and a cable 54. The photodiode 42 and scintillator 41 are covered by the X-ray collimators 44a and 44b and housing 45a and 45b. The housings 45a and 45b are made of material with high thermal conductivity, e.g., aluminum, bronze, etc., with a part thereof being in contact with the heater 46. The heater 46 and housing 45a are electrically isolated from each other completely so as to minimize the adverse influence of inductive noises from the heater on the detection system. A thermal sensor (not shown) is provided in the housing 45a so that the temperature is controlled on a PID basis.

The X-ray collimators 44a and 44b and housings 45a and 45b are covered by a thermal insulation material 47 so that they are thermally isolated from the external atmosphere. The thermal insulation material 47 may be removed from the X-ray incident area when necessary. According to this structure, the scintillator 41 and photodiode 42 are maintained within a preferred temperature range which will be described later.

Next, the thermal chamber which accommodates the detection circuit 6 will be described. The exterior is covered with an thermal insulation material 51 and the interior is provided with a housing 52 made of the same material as the housing 45a so that the temperature inside the housing 52 is uniform and constant. Provided between the housing 52 and thermal insulation material 51 is a heater 53, which is completely electrically isolated by the housing 52 so that the circuit system is free from inductive noises created by the heater.

Figure 1B:
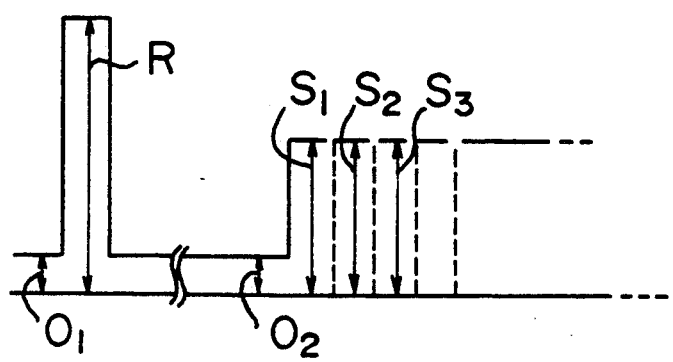

FIG. 5 shows the influence of detector temperature change on the projection data after calibration as explained on FIG. 1B. The graph shows the relative intensity rate $\eta$, which is normalized with respect to one for the X-ray intensity in the absence of a body under test, plotted against the variability among element of the temperature difference $\Delta T$ at the acquisition of air calibration data ($O_1$, R) of elements and the acquisition of signal components ($S_i$), indicating regions with and without the occurrence of a ring artifact. This result of measurement reveals that the ring artifact arises even in a region of small relative intensity rate $\eta$ depending on the value of temperature change $\Delta T$, even after offset calibration is conducted following the element sensitivity calibration. The greater the temperature change $\Delta T$ is, the larger is the region of occurrence of ring artifact. As described above, even if the sensitivity calibration and offset calibration are conducted, a temperature change between the acquisition of air calibration data and the acquisition of a signal component has a significant influence on the image data.

FIG. 5 reveals that in order to avoid the ring artifact even in an image area with a relative intensity rate of 1/100 or lower, the differences of temperature among the elements of detector need to be 0.35° C. or less. For a relative intensity rate below 1/10, temperature differences need to be 0.1° C. or less.

Figure 6:
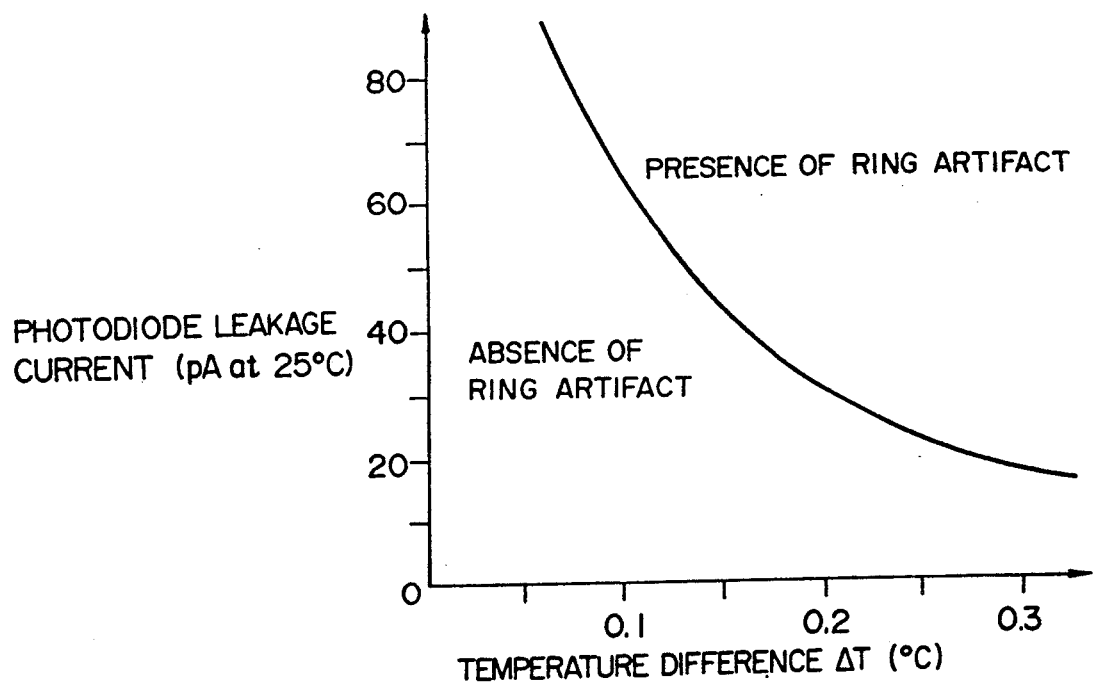

FIG. 6 shows the photodiode leakage current plotted against the variability $\Delta t$ among elements at different temperatures during the acquisition of offset data and the acquisition of a signal component of each element immediately before tomography, indicating regions with and without the occurrence of a ring artifact. The figure reveals that, with a temperature difference among elements of 0.1° C., when the leakage current of the photodiode is 65 pA or less, no ring artifact arises. It also reveals that for a temperature difference of 0.2° C., the photodiode leakage current must be reduced to 30 pA or less. In conclusion, the ring artifact does not arise when the temperature difference of the detector and the leakage current of the photodiode are in the following relation.

Leakage current [pA]·$\Delta t$[°C.] < 6.5 [pA][°C.]

Next, the relation between the photodiode leakage current and the image noise will be explained with reference to FIG. 7 which is a graph based on the examination of this. The figure reveals that as the leakage current decreases, the signal-to-noise ratio of the image deteriorates. The reason for this is that a photodiode with a smaller leakage current has a larger electrostatic capacity in general, resulting in amplification of voltage noise at the input of the detection circuit. This tendency is greatly dependent on the physical characteristics of the semiconductor material used for the photodiode, and conceivably this nature cannot be improved significantly so far as silicon-based materials are used.

Figure 7:
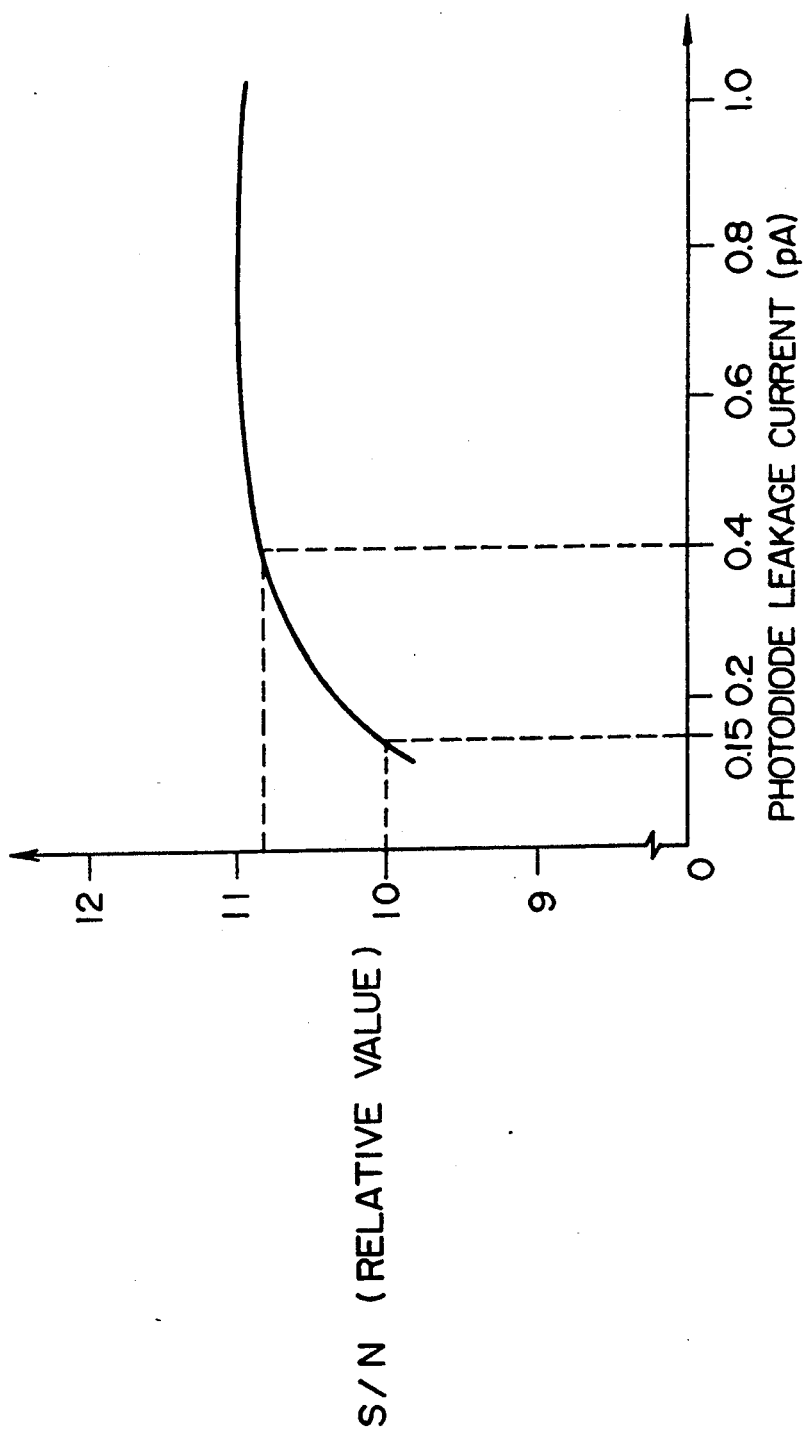

The result of FIG. 7 reveals that in order to attain an acceptable signal-to-noise ratio for the X-ray CT image for clinical diagnosis, the photodiode leakage current is 0.15 pA or more, or more preferably it is 0.4 pA or more.

Too large a photodiode leakage current promotes the occurrence of ring a artifact, as is appreciated from FIG. 6, or too small a leakage current increases the image noise, as is appreciated from FIG. 7. On this account, in designing a CT apparatus, it is necessary to choose detector photodiodes having an optimal range of leakage current as follows.

$$0.15 \leq \text{leakage current [pA]} \leq 6.5/\Delta t \quad (1)$$

or more preferably, $$0.4 \leq \text{leakage current [pA]} \leq 6.5/\Delta t \quad (2)$$

It is clear from the above explanation that in order to make possible fast tomography based on continuous X-ray exposure, it is necessary to choose photodiodes having a leakage current in a certain range and to carry out temperature control for the detector even during the X-ray exposure, thereby to minimize the temperature difference among the detectors.

According to this invention, in consideration of the relative intensity rate in tomographying a human body, temperature control for the detector is carried out so that the variability among the elements is $\Delta T = 0.35°$ C. or less based on FIG. 5, thereby to prevent the occurrence of a ring artifact even at $\eta = 1/100$. In addition, based on formula (2), photodiodes having a leakage current at $\Delta t = 0.35°$ C. in the range of 0.4 to 18 pA are used.

Among various detection circuits conceivable, the following describes a current-voltage conversion circuit shown in FIG. 3. This circuit, having relatively fast response, is suited for third generation CT apparatus based on continuous X-ray exposure. For the same reason, a differentiation filter of the second degree or higher may be used.

In the detection circuit of FIG. 3, using PIN photodiodes with a leak current of 2 pA or less at 25° C. and 18 pA or less at 35° C. without biasing, image data was produced at 35° C. without the occurrence of a ring artifact. In this case, the temperature variation in the whole detection circuit is controlled in a range of 0.35° C. or less for the temperature variation of the detector.

The temperature control employed for this invention is not confined to PID control, but on-off control, proportional control or integration control can also be used.

Figure 8:
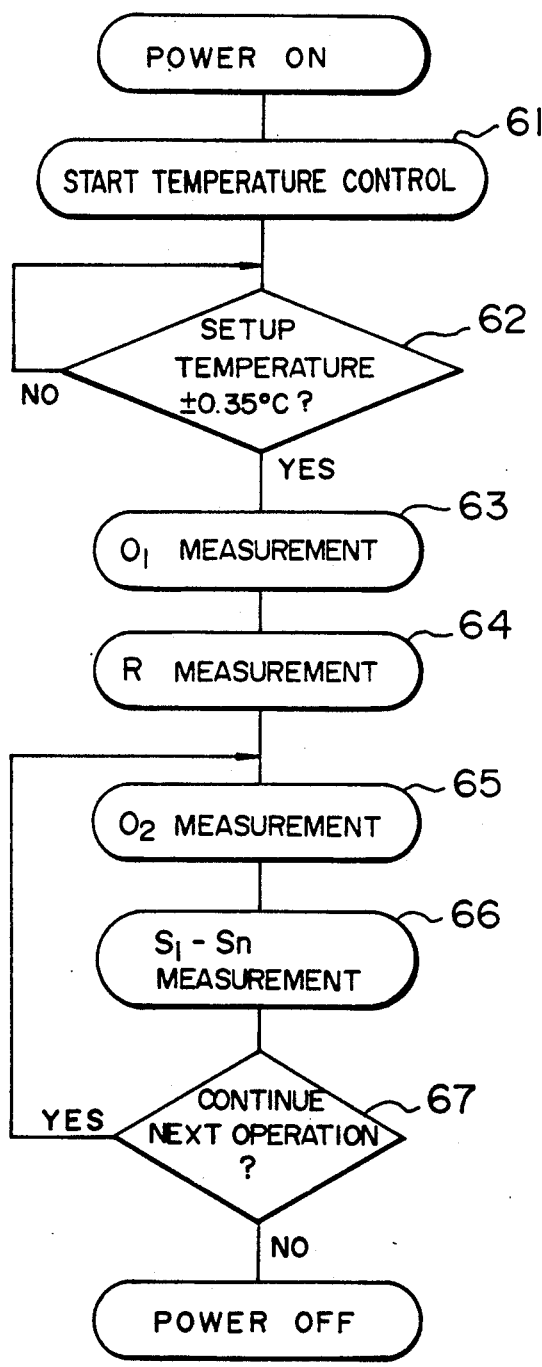
FIGS. 8 and 9 are flowcharts showing the control operation of the same embodiment.

FIG. 8 shows the control sequence for X-ray CT tomography.

When power to the CT apparatus is turned on, current flows to the heater immediately, and temperature control for the detection unit 4 and detection circuit 6 is started (step 61). The temperature control takes place such that the temperature of the detection unit 4 and detection circuit 6 is equal to the setup temperature, plus or minus 0.35° C.

Step 62 checks that the temperature in a certain time period is equal to the setup temperature plus or minus 0.35° C. or less. If the check result meets the condition, step 63 measures the offset $O_1$ of each element, and the subsequent step 64 makes an X-ray exposure in the absence of a body under test, thereby to collect the reference data R of each element. The next step 65 measures the $O_2$ of each element as the offset data immediately before tomography, and step 66 measures the actual signal data $S_1$-$S_n$. Step 67 checks whether another tomography is to be carried out or not, and in the case of a successive tomography for another patient, the control sequence returns to step 65, or in the case of the termination of tomography, power is turned off.

Figure 9:
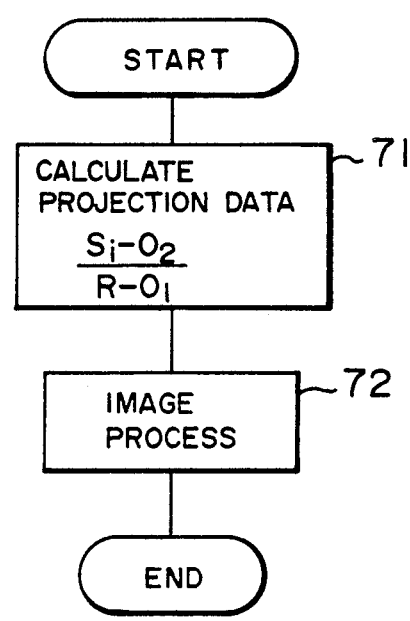

FIG. 9 shows in flowchart the operation of imaging the measured data. Step 71 calculates the projection data ( $$\frac{S_i - O_2}{R - O_1},$$

)
from the sensitivity calibration and offset calibration for each element. Step 72 performs imaging process to produce an image based on the projection data.

Although the embodiment of this invention is an X-ray CT apparatus, as an example, this invention is not confined to this application.

We claim:

1. An X-ray radiation detecting method utilizing a radiation detection unit having a detector with a plurality of elements, said method comprising the steps of:
   (a) applying a voltage to a heater in the radiation detection unit and controlling the temperature of the detector;

(b) checking that the temperature of the detector is maintained at a setup temperature plus or minus 0.35° C. as a result of the temperature control;

(c) collecting first offset data from the detector when the temperature is so maintained and no X-ray radiation is present;

(d) collecting reference data form the detector during X-ray radiation in the absence of a body under test;

(e) collecting second offset data from the detector when no X-ray radiation is present;

(f) collecting signal data during X-ray radiation through a body under test;

(g) performing an offset calibration upon the reference data and the signal data by subtracting the first offset data from the reference data and subtracting the second offset data from the signal data;

(h) performing sensitivity calibration by obtaining a ratio between the offset-calibrated reference data and the offset-calibrated signal data for each of the elements of the detector to provide projection data; and (i) processing the projection data to provide image data.

2. An X-ray radiation detecting method according to claim 1, wherein the first offset data collecting step is performed just before the reference data collecting step and the second offset data collecting step is performed just before the signal data collecting step.

3. An X-ray radiation detecting method according to claim 2, wherein each of the steps of collecting offset data and the step of collecting reference data include collecting data for each of the elements of the detector.

4. An X-ray radiation detecting method according to claim 1, wherein the step of checking includes detecting a temperature change in a certain time period.

5. An X-ray radiation detecting apparatus comprising:

(a) a radiation detection unit including a detector having a plurality of elements;

(b) means for heating said radiation detection unit;

(c) temperature control means for controlling said heating means to maintain the temperature of the detector within a predetermined range;

(d) means for checking that the temperature of the detector is maintained within the predetermined range;

(e) means for collecting first offset data from the detector when the temperature is within the predetermined range and no X-ray radiation is present;

(f) means for collecting reference data from the detector during X-ray radiation in the absence of a body under test;

(g) means for collecting second offset data from the detector when no X-ray radiation is present;

(h) means for collecting signal data during X-ray radiation through a body under test;

(i) means for performing an offset calibration upon the reference data and the signal data by subtracting the first offset data from the reference data and subtracting the second offset data from the signal data;

(j) means for performing sensitivity calibration by obtaining a ratio between the offset-calibrated reference data and the offset-calibrated signal data for each of the elements of the detector to provide projection data; and (k) means for processing the projection data to provide image data.

6. An X-ray radiation detecting apparatus according to claim 5, further comprising means for operating said first offset data collecting means just before operation of said reference data collecting means and operating said second offset data collecting means just before operation of said signal data collecting means.

7. A radiation detecting apparatus according to claim 6, wherein each of said means for collecting offset data and for collecting reference data includes means for collecting data for each of said elements of said detector.

8. An X-ray radiation detecting apparatus according to claim 5, wherein said radiation detection unit includes a scintillator and a photodiode having a leakage current in a range of from about 0.4 to about 18 pA.

9. An X-ray radiation detecting method utilizing a radiation detection unit having a detector with a plurality of elements and a heater in a detecting circuit, said method comprising the steps of:

(a) applying a voltage to the heater and controlling the temperature of the detector;

(b) checking that the temperature of the detector is maintained at a setup temperature plus or minus 0.35° C. as a result of the temperature control;

(c) collecting first offset data from the detector when the temperature is so maintained and no X-ray radiation is present;

(d) collecting reference data from the detector during X-ray radiation in the absence of a body under test;

(e) collecting second offset data from the detector when no X-ray radiation is present;

(f) collecting signal data during X-ray radiation through a body under test;

(g) performing an offset calibration upon the reference data and the signal data by subtracting the first offset data from the reference data and subtracting the second offset data from the signal data;

(h) performing sensitivity calibration by obtaining a ratio between the offset-calibrated reference data and the offset-calibrated signal data for each of the elements of the detector to provide projection data; and (i) processing the projection data to provide image data.

10. An X-ray radiation detecting method utilizing a radiation detection unit having a detector with a plurality of elements for detecting X-ray radiation and a heater, said method comprising the steps of:

(a) controlling the heater to maintain the temperature of the detector within a predetermined range of a predetermined setup temperature;

(b) collecting first offset data from the detector in the absence of a body under test and with no X-ray radiation present;

(c) collecting reference data from the detector during X-ray radiation in the absence of a body under test;

(d) collecting second offset data from the detector in the presence of a body under test and with no X-ray radiation present;

(e) collecting signal data from the detector during X-ray radiation through the body under test;

(f) subtracting the first offset data from the reference data to perform an offset calibration upon the reference data;

(g) subtracting the second offset data from the signal data to perform an offset calibration upon the signal data;

(h) determining a ratio between the offset-calibrated reference data and the offset-calibrated signal data for each element of the detector to provide projection data; and
(i) processing the projection data to provide image data.

11. An X-ray detecting apparatus comprising:
a radiation detection unit including a detector with a plurality of elements for detecting X-ray radiation, and a heater;
first control means for controlling said heater to maintain the temperature of said detector within a predetermined range of a predetermined setup temperature;
means for collecting data from said detector;
second control means for controlling said data collecting means to collect first offset data in the absence of a body under test and with no X-ray radiation present, to collect reference data during X-ray radiation in the absence of a body under test, to collect second offset data in the presence of a body under test and with no X-ray radiation present, and to collect signal data during X-ray radiation through the body under test;
offset calibration means for subtracting the first offset data from the reference data, to perform offset calibration upon the reference data, and subtracting the second offset data from the signal data, to perform offset calibration upon the signal data;
means for determining the ratio between the offset-calibrated reference data and the offset-calibrated signal data for each element of the detector to provide projection data; and
means for processing the projection data to provide image data.

12. An X-ray detecting apparatus according to claim 11, wherein:
said data collecting means includes a radiation detection circuit providing an output indicative of collected data, and means for heating said radiation detection circuit; and
said first control means includes means for controlling said heating means to maintain the temperature of said radiation detecting circuit within a predetermined range of a predetermined setup temperature.

* * * * *